United States Patent
He

(10) Patent No.: US 7,246,132 B2
(45) Date of Patent: Jul. 17, 2007

(54) METHOD OF STORING COMPRESSED DATA

(75) Inventor: Jun He, Taipei (TW)

(73) Assignee: Destiny Technology Corporation, Taipei (TW)

( * ) Notice: Subject to any disclaimer, the term of this patent is extended or adjusted under 35 U.S.C. 154(b) by 307 days.

(21) Appl. No.: 10/844,333

(22) Filed: May 13, 2004

(65) Prior Publication Data

US 2005/0257019 A1    Nov. 17, 2005

(51) Int. Cl.
*G06F 7/00* (2006.01)
(52) U.S. Cl. ....................... 707/101; 711/171
(58) Field of Classification Search ............ None
See application file for complete search history.

(56) References Cited

U.S. PATENT DOCUMENTS 5,761,536 A * 6/1998 Franaszek ................ 710/68
6,341,325 B2 * 1/2002 Franaszek et al. ......... 711/3

* cited by examiner

*Primary Examiner*—Gary Portka
(74) *Attorney, Agent, or Firm*—Harness, Dickey & Pierce, P.L.C.

(57) ABSTRACT

A method of storing compressed data first compresses source data, generating compressed data, and computes the total compression length in each row of the compressed data. The number of rows of compressed data that the biggest memory block can accommodate is computed according to the total compression length of each row. The system receives an application for the required memory blocks for those rows of data. Finally, the system allocated memory blocks are received for storing the compressed data. Therefore, the system and method realize dynamical row storage of compressed data, which make good use of fragmented memory in the system.

6 Claims, 3 Drawing Sheets

| the length of the first row | the first row of compressed data | | the length of the second row | the second row of compressed data |
|---|---|---|---|---|
| the length of the third row | the third row of compressed data | | | |
| the length of the fourth row | the fourth row of compressed data | the length of the fifth row | the fifth row of compressed data | |
| the length of the sixth row | the sixth row of compressed data | | | the length of the seventh row |
| the seventh row of compressed data | | the length of the eighth row | the eighth row of compressed data | |
| ... | | ... | the length of the nth row | the nth row of compressed data |

FIG.3

METHOD OF STORING COMPRESSED DATA

BACKGROUND OF THE INVENTION

1. Field of Invention

The invention relates to a data storage method and, in particular, to a method of storing compressed data.

2. Related Art

Complicated operations often demand for a huge amount of system memory. Therefore, those data had better to be compressed in order to save the use of memory.

A conventional compression method is to allocate a sufficiently large compression work space ComWorkSpace for the compression functional module to store the compressed data. Once the compression functional module is done with its job, a compressed data length, CompressenLength, is returned. The application releases the memory space occupied by the source data and applies from the system for memory NewBuffer with the size of CompressenLength. The compressed data in ComWorkSpace is copied to the applied memory NewBuffer. However, sometimes for complicated operations, no sufficient memory is allocated to store the source data and thus the data cannot be processed because the system memory is seriously fragmented or the system simply does not have sufficient space. Another situation where the data cannot be processed is that the application for a space of the size of CompressenLength is not successful. A conventional solution is to try to use another compression algorithm with a higher compression ratio to compress the source data and to apply again for NewBuffer with the size of CompressenLength. If this method is still not successful, there is no way to compress the data.

SUMMARY OF THE INVENTION

In view of the foregoing, the invention provides a method of storing compressed data. Its primary objective is to avoid requests for large continuous memory space from the system. Therefore, even when lots of fragments exist in the system that forbid the application of large storage memory space, the invention still can process the compression and storage of a large block of data.

To achieve the objective, the invention provides a method of storing compressed data that dynamically divides compressed data into rows according to the size of the largest memory space. It first compresses the source data to generate compressed data. It then computes the total compression length of each row in the compressed data. It extracts the largest memory space. According to the total compression length of each row, the method computes the number of rows of the compressed data that can be accommodated in the largest memory space. It then applies for memory space from the system according to corresponding rows of the compressed data. After receiving memory space allocated by the system, the method stores corresponding rows of the compressed data to the memory space.

According to the disclosed method, the compressed data can be dynamically stored by rows according to the size of the largest memory space until all of the compressed data are stored. It makes good use of fragments in the system memory. It enhances the usage of system memory particularly for complicated operations in embedded systems.

BRIEF DESCRIPTION OF THE DRAWINGS

The invention will become more fully understood from the detailed description given hereinbelow illustration only, and thus are not limitative of the present invention, and wherein:

FIG. 3 is a schematic view of the format of the compressed data according to the invention.

DETAILED DESCRIPTION OF THE INVENTION

Figure 1:
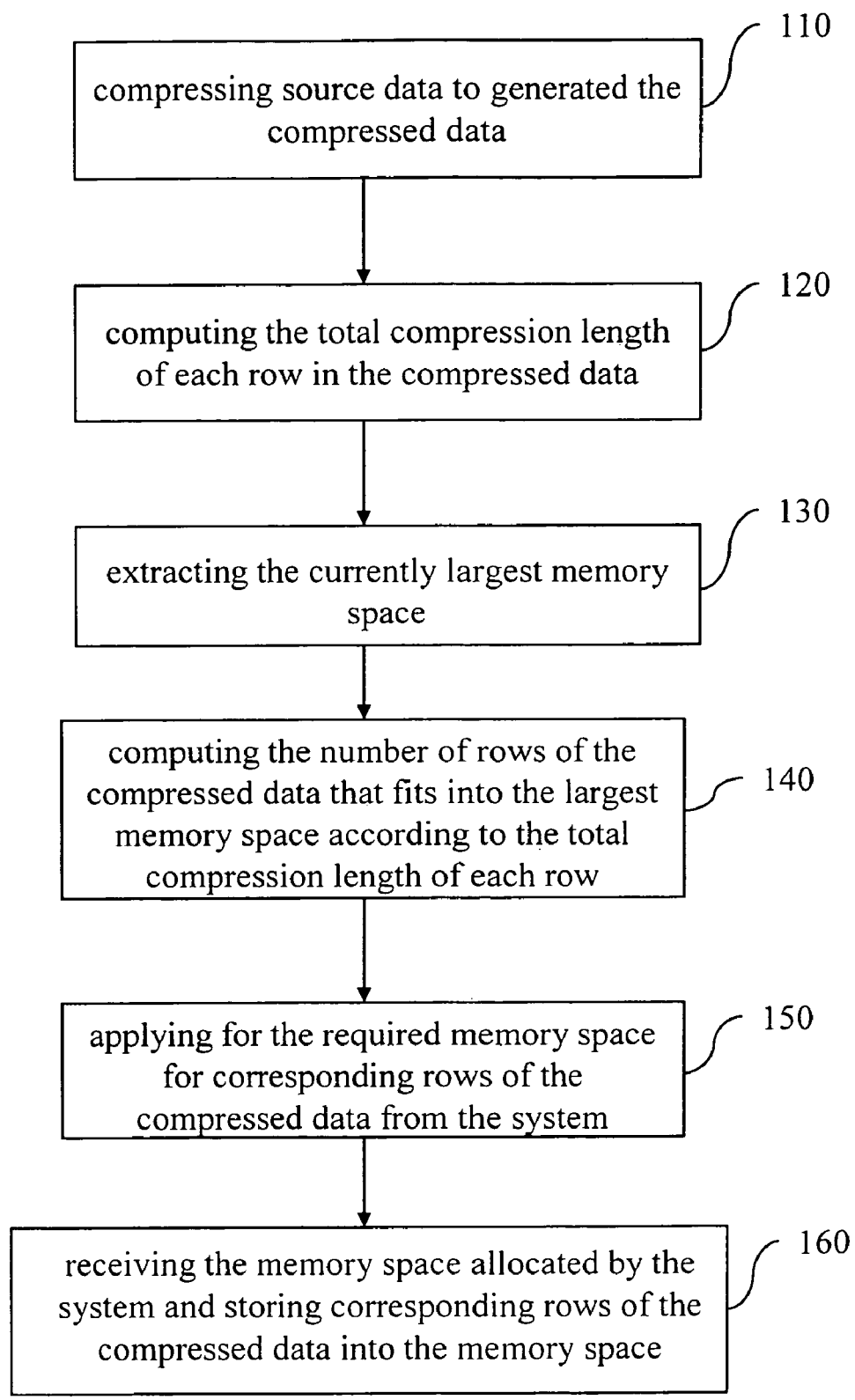
FIG. 1 is an overall flowchart of the disclosed method of storing compressed data.

The specification discloses a method of storing compressed data. We use FIG. 1 to explain the disclosed method. First, the source data are compressed to generate compressed data (step 110). The total compression length of each row of the compressed data is computed (step 120). The largest memory space is extracted (step 130). The number of rows of the compressed data that can be stored in the largest memory space is computed according to the total compression length (step 140). The system is asked for the required memory space (step 150). After receiving the memory space allocated by the system, corresponding rows of the compressed data is stored in the memory space (step 160).

Figure 2:
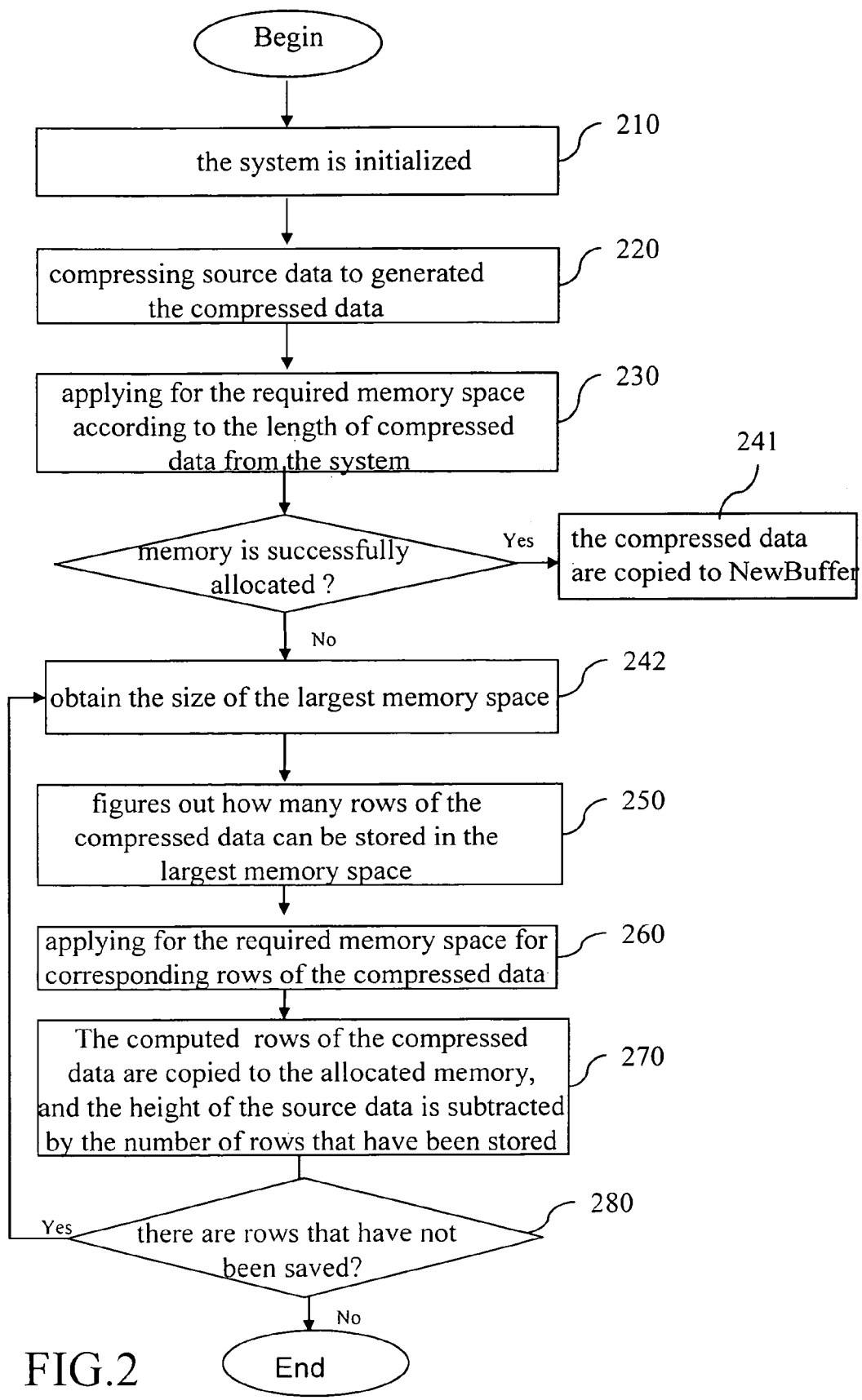
FIG. 2 is a flowchart of an embodiment of the invention.

In the following, we use an embedded system as an example to explain the disclosed method. Please refer to FIG. 2 at the same time for the flowchart.

First, the system is initialized (step 210) to prepare and allocate a sufficiently large memory space SrcStaticBuffer for storing the source data and a sufficiently large compression work space ComWorkSpace for the compression functional module. When the allocation of the memory for storing the source data is not successful, the system uses the pre-allocated SrcStaticBuffer to store the source data. The compressed data generated by the compression functional module are stored in the fashion of the length of the row+the compressed data (step 220). For example, for a set of source data with a height of 4, the compressed data are: the length of the first row+first row of compressed data, the length of the second row+second row of compressed data, the length of the third row+third row of compressed data, and the length of the fourth row+fourth row of compressed data. The explicit format of the compressed data is shown in FIG. 3. The total compression length CompressedLength is the number of bits for storing the length of a row plus the compressed data of the row.

The application applies for memory NewBuffer with the size of CompressedLength from the system according to the total compression length (step 230). If the memory is successfully allocated, the compressed data are copied to NewBuffer (step 241). If the memory allocation is not successful, the API function of the system is used to obtain the size of the largest memory space, MaxBlockSize (step 242). According to the compression length of each row recorded in the compressed data, the, system figures out how many rows of the compressed data can be stored in the memory of size MaxBlockSize, computing the size of memory for storing all these rows (step 250). Then applies the memory space of the required size from the system. The application will definitely be successful this time (step 260). The computed rows of the compressed data are copied to the allocated memory, and the height of the source data is subtracted by the number of rows that have been stored (step 270).

If there are still rows that have not been saved in the compressed data (step 280), the MaxBlockSize of the memory is obtained again. According to the lengths of rows of the compressed data, the number of rows that can be saved in the memory with size MaxBlockSize can be computed. Then applies the memory required for these rows from the system. Again, the memory will definitely be successfully allocated. The compressed data are then saved to the allocated memory. The above steps are repeated until all rows in the source data are saved to different memory spaces with sizes from large to small.

Certain variations would be apparent to those skilled in the art, which variations are considered within the spirit and scope of the claimed invention.

What is claimed is:

1. A method for dynamically storing compressed data in rows, the method comprising the steps of:
   compressing source data to generate compressed data;
   computing a total compression length of each row in the compressed data;
   extracting a memory space currently having a largest size;
   computing a number of rows of the compressed data that fits into the memory space currently having the largest size according to the total compression length of each row;
   applying for a required memory space for corresponding rows of the compressed data from a system;
   receiving the required memory space allocated by the system and storing the corresponding rows of the compressed data into the required memory space;
   determining whether there are still unsaved rows in the compressed data, wherein the determination refers to a quantity defined by a difference between a number of total rows of the source data and the number of rows of the compressed data that have been saved; and
   repeating the steps of extracting, computing, applying, receiving and determining until all the compressed data are saved if there are unsaved rows in the compressed data.

2. The method of claim 1 further comprising the step of initializing the system through the steps of:
   allocating a memory space for the source data; and
   allocating a compression work space for the compression function.

3. The method of claim 1, wherein a format of the compressed data is "length of a row+the compressed data of the row."

4. The method of claim 1, wherein the total compression length of each row is the number of bits occupied by the compression length data of a row and the compressed data of the row.

5. The method of claim 1, wherein the step of extracting the memory space currently having the largest size is achieved using an API function.

6. The method of claim 1, wherein the step of applying for the required memory space for corresponding rows of the compressed data from the system includes accumulating a memory size required for storing the compression data.

* * * * *